(12) United States Patent
Lai

(10) Patent No.: US 6,539,629 B2
(45) Date of Patent: Apr. 1, 2003

(54) ROLLER SHAFT ON COMPUTER CHARACTER-CUTTING DEVICE AND METHOD TO MANUFACTURE THE SAME

(75) Inventor: Jin-Sheng Lai, Hsi-Chih (TW)

(73) Assignee: Great Computer Corp., Hsi-Chih (TW)

(*) Notice: Subject to any disclaimer, the term of this patent is extended or adjusted under 35 U.S.C. 154(b) by 0 days.

(21) Appl. No.: 09/769,347

(22) Filed: Jan. 26, 2001

(65) Prior Publication Data

US 2002/0103061 A1 Aug. 1, 2002

(51) Int. Cl.$^7$ .................. B21D 53/00; A01B 29/00
(52) U.S. Cl. .................. 29/895.211; 29/895.3; 492/37; 492/48
(58) Field of Search .................. 29/895.21, 895.2, 29/895.211, 428; 492/30, 37, 48, 54, 58; 219/121.64; 228/129, 130, 131, 134

(56) References Cited

U.S. PATENT DOCUMENTS

| | | | |
|---|---|---|---|
| 1,690,684 A | * 11/1928 | Johnson | 228/129 |
| 5,343,807 A | * 9/1994 | Hackelborger et al. | 492/30 |
| 5,351,615 A | * 10/1994 | Kobler et al. | 101/376 |
| 5,379,693 A | * 1/1995 | Hoffmann et al. | 101/375 |
| 5,488,903 A | * 2/1996 | Kobler et al. | 101/375 |
| 6,148,725 A | * 11/2000 | Knauer et al. | 101/217 |

* cited by examiner

Primary Examiner—I Cuda Rosenbaum
Assistant Examiner—Marc Jimenez
(74) Attorney, Agent, or Firm—Dennison, Schultz & Dougherty

(57) ABSTRACT

A method for manufacturing a roller shaft of a computer character-cutting device and the roller shaft itself are disclosed, wherein, an engaging belt having on the surface thereof etched tooth grains is wrapped over the roller shaft, laser welding is processed at the joint of the engaging belt. The laser welding creates high temperature to melt the engaging belt, and the melting spots on the engaging belt are leveled, so that the engaging belt is integrally molten into the roller shaft to largely reduce steps and cost of production, and an effect of high accuracy of paper feeding can be obtained.

1 Claim, 5 Drawing Sheets

ROLLER SHAFT ON COMPUTER CHARACTER-CUTTING DEVICE AND METHOD TO MANUFACTURE THE SAME

BACKGROUND OF THE INVENTION

The present invention is related to a method for manufacturing a roller shaft of a computer character-cutting device and to the roller shaft itself, and especially to a method to directly and tidily connect an engaging belt with the roller shaft by laser welding, it suits various rollers or roller shafts of paper feeders and their method of manufacturing.

FIG. 1 shows a conventional roller 10, wherein, the surface thereof has toothed grains 11 which are formed by direct embossing on the roller 10 and then by surface curing to get the standard hardness of the desired product. Wherein, in the surface curing process, the tooth tips mutually engaging will be slightly dulled; and direct processing on the roller has larger difficulty, after using a period of time, engaging force will be dulled by continuous abrading, this is a very undesired situation.

In order to solve the defect of the conventional roller shaft of a character-cutting device, there has been another roller (as shown in FIG. 2) composed of a roller axle 20, an external sleeve 21 and an engaging belt 22. The thin steel sheet forming the engaging belt 22 is etched to have sharp slim tooth grains on the surface of the thin steel sheet for wrapping around and spot welding to the external sleeve 21, the two ends of the external sleeve 21 spot welded to the engaging belt 22 are stuck to the roller axle 20.

Such a roller can increase frictional braking force of the surface of the roller, but the joint on the engaging belt 22 is combined by spot welding, accuracy of positions of the spots 23 as shown in FIG. 3 is uneasy to control, the path for spot welding is a rotary and twisting one; a product generally can not render a space "a" between two spots straddling the joint equal to another space "b" between further two spots straddling the joint, neither render the space "c" of a spot from the joint line equal to another space "d" of a neighboring spot from the joint line. Thereby, viewing at an enlarged area as shown, it is evident to see that the edges of the engaging belt 22 are upwardly bent, for a shorter paper to be fed, the error of feeding is within the tolerance, while for a longer paper such as of 10 m, the tolerance is only 1 mm, accumulation of errors will make evident inaccuracy of the fed paper. Elements of the roller are plural; this can increase cost and inconvenience of production. (Note: paper feeding is run repeatedly forward and backward in a rotational way, the teeth are rough and accuracy is inferior, the rotational inertia will make error of size).

SUMMARY OF THE INVENTION

The present invention has a main object to provide a method for manufacturing a roller shaft of a computer character-cutting device and to the roller shaft itself.

The present invention has a secondary object to provide a method for manufacturing a roller shaft of a computer character-cutting device and to the roller shaft itself of which the novel structure makes the roller shaft more accurate in paper feeding, and can have a smaller tolerance.

To get the object, the present invention wraps an engaging belt having on the surface thereof etched tooth grains over a roller shaft, and then laser welding is processed at its joint. Laser welding creates high temperature to melt the engaging belt, and the melting spots on the engaging belt are leveled, so that the engaging belt is integrally molten into the roller shaft to largely reduce steps and cost of production.

The present invention will be apparent after reading the detailed description of the preferred embodiment thereof in reference to the accompanying drawings.

DETAILED DESCRIPTION OF THE PREFERRED EMBODIMENT

Figure 4:
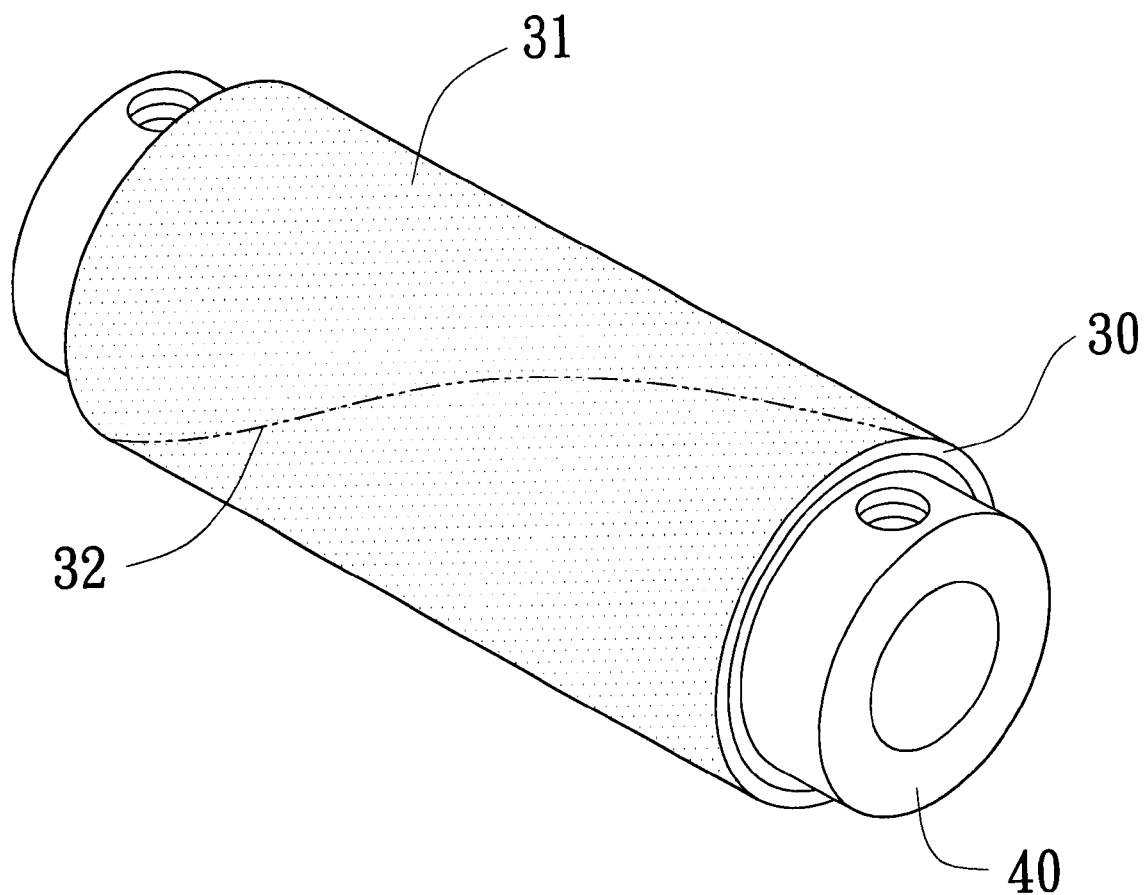
FIG. 4 is a perspective view showing an embodiment of the present invention.
Figure 5:
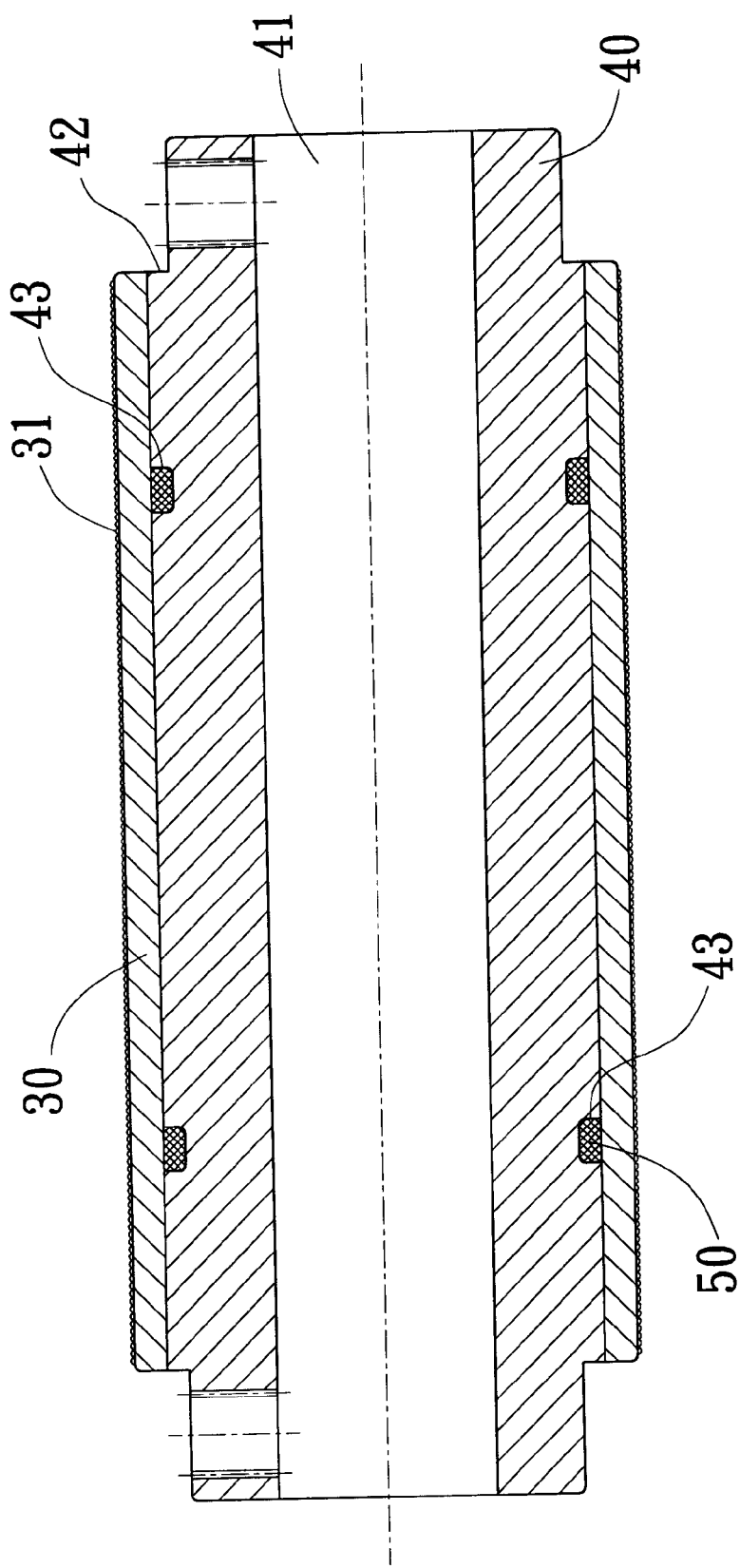
FIG. 5 is a sectional view showing the embodiment of the present invention.

Referring to FIGS. 4 and 5, the present invention is comprised mainly of an engaging belt 30 and a roller 40, wherein, the engaging belt 30 is formed from a thin steel sheet which is etched to be fully covered with engaging teeth 31.

The roller 40 is a cylinder with a central hole 41, and is provided on each of the two ends thereof with a stepped surface 42, so that there are difference of diameters of the periphery of the central hole 41 and the roller 40 at the said both ends, and the surface of the roller 40 has near the front and the rear ends thereof respectively a groove 43.

Figure 6:
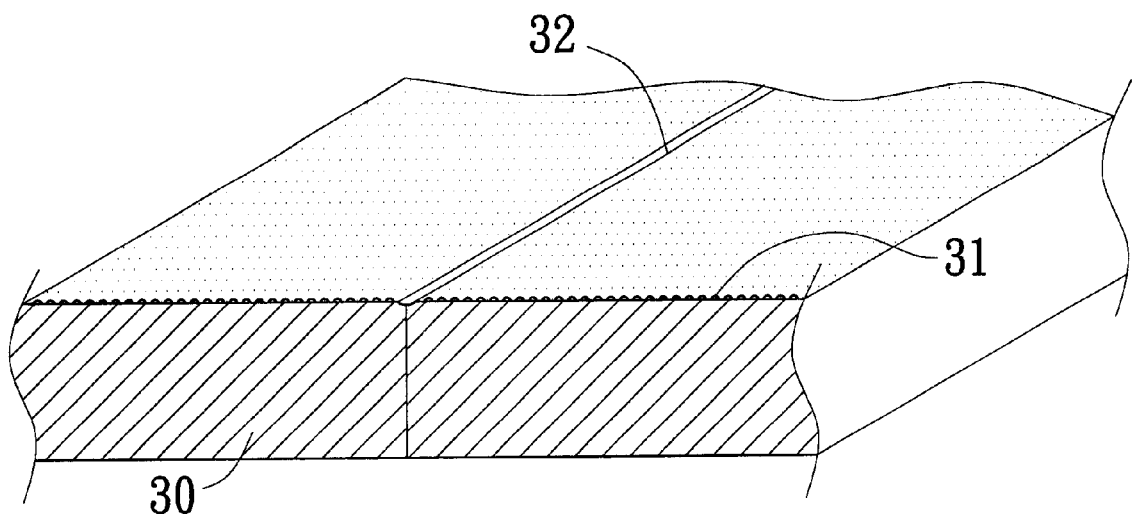
FIG. 6 is a partial enlarged perspective sectional view of the embodiment of the present invention.

As shown in FIGS. 5 and 6, the surface of the roller 40 and the grooves 43 are applied with glue 50, the engaging belt 30 being etched is stuck directly onto the grooves 43, while the joint 32 of the engaging belt 30 is processed with laser welding. This not only renders the joint 32 of the engaging belt 30 even and tidy in combining to get a closed state, but also renders the glue 50 stuck to and embedded in the grooves 43 to give an effect of skid-proofing, assembling of the present invention thus is completed.

Figure 1:
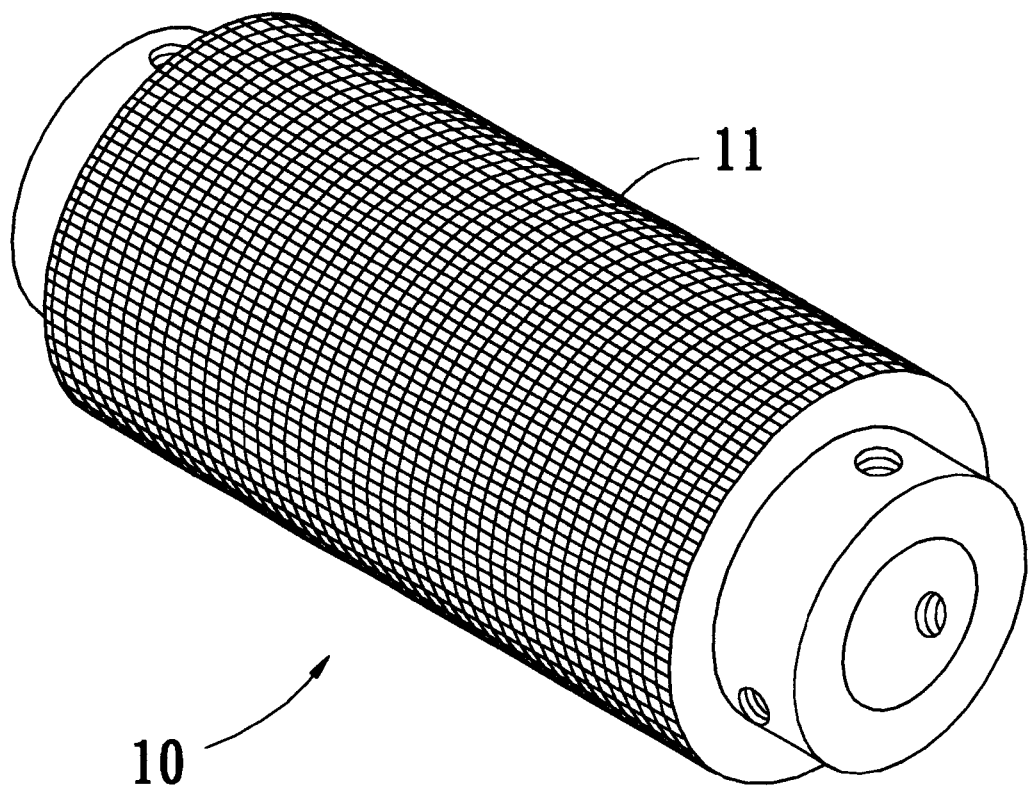
FIG. 1 is a perspective view of a conventional roller shaft.
Figure 2:
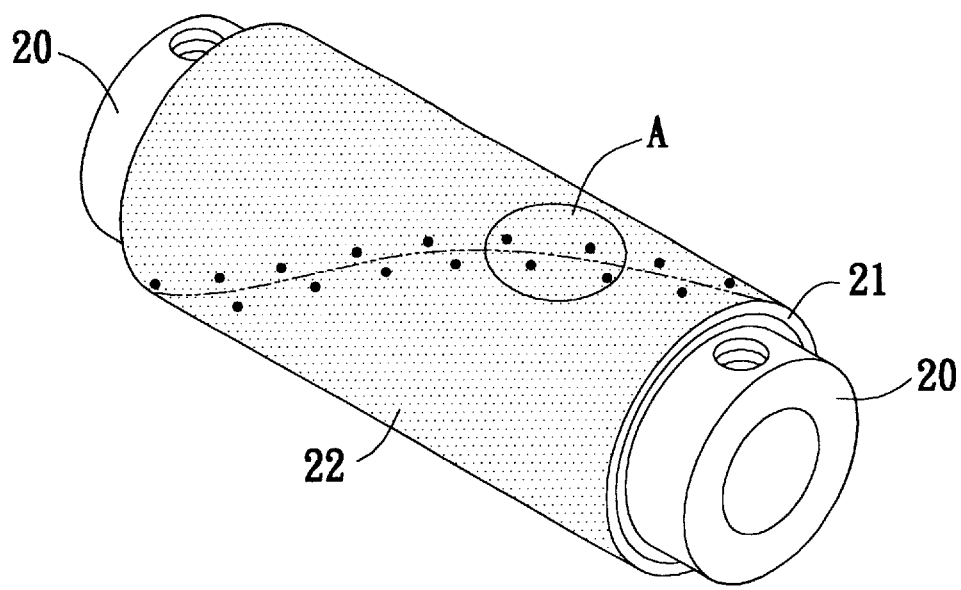
FIG. 2 is an analytic perspective view showing the elements of another conventional roller shaft.
Figure 3:
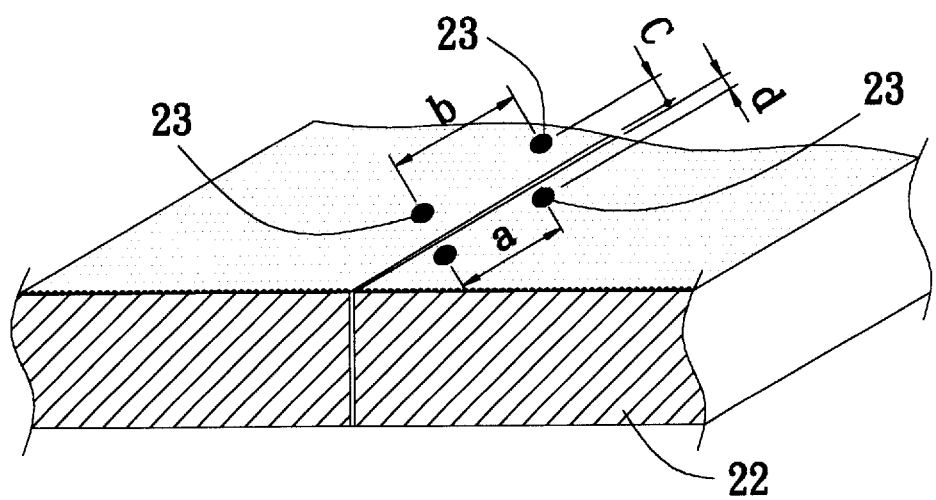
FIG. 3 is a partial enlarged perspective sectional view taken from FIG. 2.

As shown in FIG. 6, by virtue that the joint 32 of the engaging belt 30 of the present invention is processed with laser welding and is molten in high temperature, the connecting spots on the joint 32 are quite even and tidy, the present invention does not have the defect of upward bending at the welding area as is the case of the engaging belt of a conventional roller (referring again to FIG. 3).

Accordingly, the structure of the present invention has the following advantages:

1. The engaging belt can be stuck to and molten directly into the surface of the roller, the whole structure simplifies the threes pieces of the conventional roller into two pieces; this makes manufacturing convenient and can get the object of reducing steps and cost of production.
2. Efficient space combination of the present invention makes the joint of the engaging belt quite even and tidy, totally overcomes the defect of upward bending at the edges of the joint when in spot welding as is the case of the engaging belt of a conventional roller.
3. Even more important, in application, the structure of the present invention can make paper feeding more accurate, and can have a minimum tolerance scope.

The above stated novel structure of the roller shaft of a computer character-cutting device and the method for manufacturing the same of the present invention not only solves the defect of complication of processing of the conventional roller for a computer character-cutting device, but also provides a manufacturing method which is convenient and cost saving. The present invention is novel and superior in market competition, and has its industrial value.

Having thus described my invention, what I claim as new and desire to be secured by Letters Patent of the United States are:

1. A method for manufacturing a roller shaft of a computer character-cutting device comprising the steps of:

providing a cylindrical roller having two ends and a first surface between the two ends and two step surfaces near the two ends and wherein the roller includes a hole passing through the roller and two grooves in the first surface;

forming an engaging belt with two ends from a thin steel sheet and etching the belt to be fully covered with engaging teeth;

applying glue to the first surface of the roller and to the pair of grooves;

wrapping the engaging surface around the roller between the stepped end surfaces and over the pair of grooves to form a joint between the two ends of the engaging belt; and laser welding the joint to thereby provide a smooth surface.

* * * * *